Dec. 1, 1953

N. C. FOSTER 2,661,307

PROCESS FOR APPLYING A COMPLETELY POLYMERIZABLE THERMOSETTING RESINOUS COMPOSITION TO AN ELECTRICAL MEMBER

Filed Jan. 19, 1949

WITNESSES:

Edward Michaels

N. W. C. Groome

INVENTOR

NEWTON C. FOSTER.

BY

Frederick Shapoe

ATTORNEY

UNITED STATES PATENT OFFICE 2,661,307

PROCESS FOR APPLYING A COMPLETELY POLYMERIZABLE THERMOSETTING RESINOUS COMPOSITION TO AN ELECTRICAL MEMBER

Newton C. Foster, Pittsburgh, Pa., assignor to Westinghouse Electric Corporation, East Pittsburgh, Pa., a corporation of Pennsylvania Application January 19, 1949, Serial No. 71,576

5 Claims. (Cl. 117—49)

Figure 1:
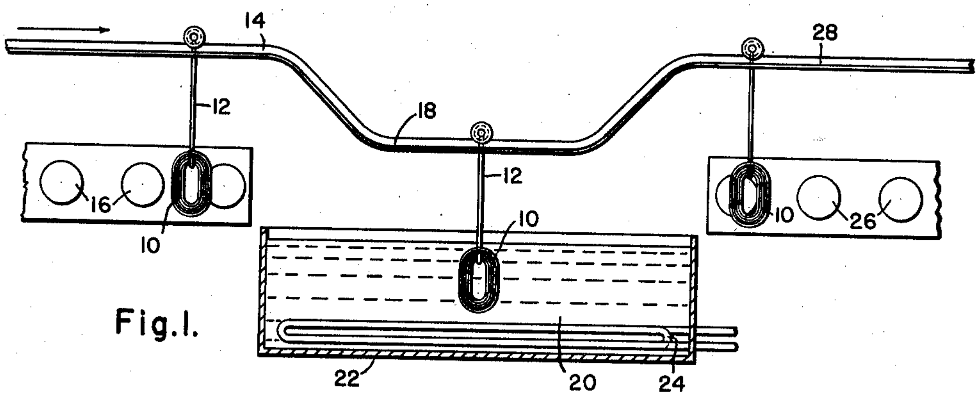

This invention relates to processes for treating members, particularly electrical members with completely reactive polymerizable compositions.

Considerable difficulty is encountered in the application of completely polymerizable reactive compositions to members to secure the best results therefrom. While completely polymerizable reactive compositions have the inherent advantage of enabling in one treatment a complete filling of all of the interstices or spaces in members such, for example, as electrical coils, conventional practices used heretofore in varnish treating members with conventional varnishes containing volatile solvents are unsuitable for cooperating with completely polymerizable compositions to produce such complete filling. Thus, simply dipping a coil in a bath of a completely polymerizable reactive liquid composition and then withdrawing the coil permits much of the liquid composition to drain from the coil so that interstices of any size are unfilled. The composition is retained only by capillary and wetting or adhesive action within the body of the coil. Consequently it is necessary to employ practices departing radically from conventional varnishing practice in order to take best advantage of the completely polymeriable compositions. One example of such difference in practice is that set forth in the C. F. Hill, et al. Patent 2,414,525 which has proven to be quite satisfactory in applying a completely reactive composition to members. However, the process of this patent is not suitable for certain forms of electrical apparatus and it entails a considerable amount of handling as compared to ordinary varnishing treatment.

It is known to preheat an electrical coil, or similar electrical member, and to dip it briefly, less than a minute, in a conventional volatile solvent varnish, and then withdrawing the coil with a coating of adhering varnish so that the heat of the coil will drive off the solvent from the coating. However, such procedure cannot be satisfactorily employed with completely reactive compositions. No benefits are secured and, in fact, detrimental effects on the compositions take place because of volatilization of components thereof.

The object of this invention is to provide a process having steps correlated with completely polymerizable compositions for applying to members a coating or an impregnation of a predetermined amount of the completely polymerizable composition.

A further object of the invention is to provide a process for solidly impregnating the interstices of the electrical members, particularly the windings thereof, with a completely polymerizable reactive composition, by preheating the members and immersing in the composition until a sufficient amount of gelled composition has been produced.

Figure 2:
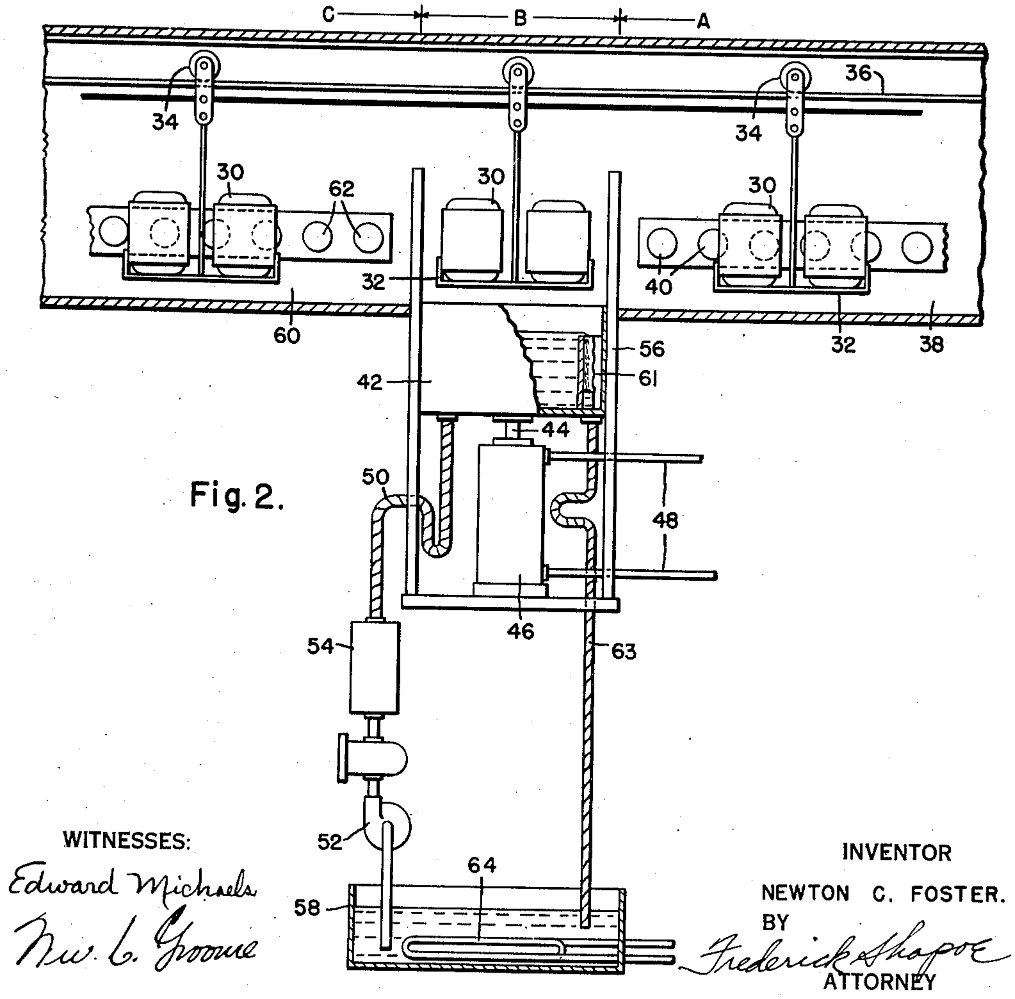

Other objects of the invention will in part be obvious and will in part appear hereinafter. For a better understanding of the nature and objects of the invention, reference should be had to the following detailed description and drawing, in which:

Figure 1 is a view in elevation of one form of apparatus for practicing the process, and Fig. 2 is a view in elevation partly in section of a different form of apparatus for practicing the process of the invention.

In accordance with the present invention, members and particularly electrical members are treated to apply thereto a controllable amount of a completely reactive polymerizable liquid composition so that the surfaces of the members are coated to a selected thickness and any interstices in the members may be substantially completely filled with the composition in a single treatment. More specifically, the process comprises preheating the member to an elevated temperature and dipping the preheated member in a completely reactive liquid composition, said composition being capable of gelling in a few minutes at a temperature substantially below the preheating temperature, whereby the heat in the member causes the composition in any internal spaces and in contact with the exterior surfaces to polymerize progressively into an adherent gel, and withdrawing the member from the composition when the gel has built up thereon to a predetermined amount. Thereafter the gelled composition on the member may be further cured to a hard polymer.

More particularly the members being treated are preheated to a temperature at least 20° C. above the temperature at which the completely reactive composition will gel in a period of time of from 2 to 5 minutes. Upon immersing members heated to this extent in the composition, the composition in direct contact with the hot surfaces of the member will heat up rapidly and will initially decrease in viscosity and, therefore, the composition will readily penetrate into the interstices of the member. However, as the composition heats up to the temperature at which it will gel in a few minutes, after passage of an appropriate brief period of time, the composition within the interstices will begin to gel progressively from the contacting surfaces of the member so that in a few minutes after immersion the finer interstices will be completely filled with gelled composition and the thickness of the gelled composition on other surfaces will increase in proportion to the time of immersion. By properly correlating the preheating temperature and the time of immersion, a coating or impregnation of the gelled composition of any desired thickness or amount can be secured. The process can be employed to merely coat a non-porous member with a thick coating or layer of the composition upon all of the surfaces immersed in the composition. The process is particularly adapted for the treatment of porous or more or less open members such as coils, windings and the like, to fill the interval pores or spaces solidly.

Preheating a member just to the gel temperature or slightly above is not satisfactory, since the member will be cooled by contact with cold completely reactive composition to the extent that the composition will not gel in or on the member within a practical period of time.

The process of this invention may be applied to any article upon which it is desired to produce a coating or thick layer of solid composition, such, for example, as metallic members of various kinds, plastic bodies, porcelain and glass, and the like. However, the process is most beneficial in treating members having a porous or open structure for the purpose of completely filling the pores, openings, interstices or the like. Thus, metallic structures having numerous apertures and the like requiring filling or coating for reducing corrosion or to render them smoother may be treated by the process. The process has been employed with considerable success in treating electrical members to improve their insulation. Hairpin coils, field coils, rotor coils, bobbin wound coils, pancake coils and shell type coils are examples of windings that may be treated with outstanding results. Other types of electrical members that have been treated are rotors, transformer core and coil assemblies and electromagnet coils. Assembled magnetic laminations may be treated by the process to impregnate the interlaminar spaces with an insulating and bonding resin. The electrical coils or windings that may be treated preferably contain only turn insulation and very little or no external layers of ground insulation. Thus enameled wire or wire covered with other glass fiber, asbestos paper, silk alone or in combination with enamel may be formed into coils and the coils treated in accordance with the process not only to impregnate the interstices but also to build up a thick exterior layer of the composition to function as a ground insulation. If desired, the coils or other electrical apparatus may have been previously given a coating of a conventional varnish containing an evaporable solvent though this is not necessary.

Completely reactive polymerizable compositions suitable for use in practicing the process may include any fluid completely polymerizable composition that upon being heated to a predetermined temperature polymerizes first to a relatively non-flowable gel and then into a resinous body. Such fluid completely polymerizable compositions may comprise a single component polymerizable in a few minutes at a predetermined temperature, preferably, but not necessarily, at a temperature of between 50° C. and 150° C. Examples of such single component compositions are diallyl phthalate, diallyl succinate, diallyl maleate, diallyl adipate, methallyl acrylate, diallyl ether, allyl acrylate and allyl crotonate. These compositions comprise at least one unsaturated group >C=C< capable of vinyl-type addition polymerization. The best results have been secured with monomers or compounds containing two or more of these unsaturated groups capable of polymerization upon being subjected to heat. It will be understood that mixtures of any two or more of the polymerizable compounds or monomers may be employed.

Numerous other multi-component completely-reactive liquid polymerizable compositions are known in the art. Such compositions include, in many cases, an unsaturated resinous component, preferably an unsaturated alkyd resin, and an unsaturated polymerizable liquid monomer having the group >C=C< and will gel in 2 to 5 minutes at a temperature in the range of from 50° C. to 150° C. Particularly good results have been secured by employing as the resinous alkyd resin the reaction product of an ethylenic dicarboxylic acid or anhydride thereof such, for example, as maleic acid, furmaric acid, maleic anhydride, monochloromaleic acid, itaconic acid, itaconic anhydride, citraconic acid and citraconic anhydride. The unsaturated dicarboxylic acid or anhydride or mixtures thereof are reacted with a polyhydric alcohol such as glycol, glycerol, or pentaerythritol or mixtures thereof, or an unsaturated alcohol such as allyl alcohol, or methallyl alcohol. For example, castor oil has been employed successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, the unsaturated alpha-beta dicarboxylic acid or anhydride may be replaced with up to 90% of the weight thereof of a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols, particularly when reacted with dicarboxylic acids instead of their anhydrides.

In preparing the completely reactive compositions, the alkyd esters may be dissolved in a liquid unsaturated monomer having the group $H_2C=C<$. Suitable liquid unsaturated polymerizable monomers are those boiling above 40° C. and examples are: monostyrene, alpha methyl styrene, 2,4-dichlorostyrene, paramethyl styrene, vinyl acetate, methyl methacrylate, ethyl acrylate, diallyl phthalate, diallyl succinate, diallyl maleate, methallyl alcohol, acrylonitrile, methyl vinyl ketone, diallyl ether, vinylidene chloride, butyl methacrylate, allyl acrylate, allyl crotonate, 1,3-chloroprene and divinyl benzene, or mixtures of two or more of any of these monomers.

In practicing the process, members to be treated are initially preheated by any suitable means to a temperature of at least 20° C. above the gelation temperature of the completely polymerizable composition. Infrared heating lamps, hot air ovens and similar heating equipment is well known and may be employed as is convenient or desirable. In some cases, electrical windings or coils may be heated by simply passing electrical current either direct or alternating through the winding, thereby generating sufficient heat internally to increase the temperature of the winding to the required extent. After the member has been preheated, the completely polymerizable composition is applied to the member, usually by dipping or immersing the heated member in the composition.

On being immersed in the completely polymerizable composition, the preheated members may be oscillated or moved through the composition if it is desired to prevent heavy coatings of gelled composition building up on the exterior surfaces of the member. The composition within the interstices will not be affected to any great extent by such movement, remaining more or less in place so that it heats up rapidly to the gelation temperature and will rapidly gel in place. However, the motion will keep the composition moving across the exterior surfaces without more than a surface film being in contact long enough to heat up to a gel state and thus only a thin exterior coating of gel will be secured. Obviously, the member need not be moved, but the composition itself may be stirred or pumped vigorously to secure an equivalent result. With large members weighing a hundred pounds or more, such agitation is desirable to avoid massive gel formation. By this procedure stators whose bores must fit closely to rotors can be produced with only a few mils thickness of gel coating.

On the other hand preheated members may be immersed in the completely reactive composition with a minimum of stirring and heavy coatings of gelled composition built up thereon. In this way field coils and the like may be provided at their exteriors with a heavy layer of gelled composition to provide ground insulation.

Referring to Fig. 1 of the drawing, there is illustrated a conveyorized system suitable for practicing the process of the invention. The member 10 which may be an electrical winding or a wound magnetic core is supported by a roller mounted hanger 12 for travel along the track 14 from left to right as seen in the drawing. The member 10 passes between banks of infrared heating lamps 16 of sufficient capacity so that the member 10 is heated to the required temperature in a given period of time. After reaching the desired temperature, the hanger 12 with its member is moved to the depressed portion 18 of the track 14 so that the hot member 10 is immersed within the body of liquid completely polymerizable composition 20 contained in the tank 22. The hanger 12 may be moved continuously through the tank to minimize surface gel build-up, or, if heavy exterior gel coatings are desired, it may remain in one place until removed from the vicinity of the tank. A cooling pipe 24 is present to cool the composition to a low temperature to secure good tank life. After being disposed in the composition 20 for a time sufficient to fill the interstices with gelled composition or to build up a suitably thick coating of gel on the member 10, the hanger 12 is moved to the elevated portion 28 of the track where the member 10 is further heated or baked by other infrared heating lamps 26. The time of treatment by the lamps 26 is dependent on the degree of cure desired for the composition. Ordinarily, the time of treatment need not exceed 1 hour and in some cases only a few minutes are sufficient. Instead of infrared lamps, a hot air oven may be used, though longer baking times are required.

Another form of apparatus suitable for practicing the invention is illustrated in Fig. 2 of the drawing. The apparatus of Fig. 2 is particularly adapted for the treating of stators and similar electrical members. Stators 30 are mounted in pairs on a support 32 movable on rollers 34 along a track 36 from right to left as shown in the drawing. The section A of the track passes through a baking oven 38 comprising a plurality of heating lamps 40. The time of movement through the oven 38 and the capacity of the infrared lamps 40 are correlated to heat the stators 30 to a temperature at least 50° above the gelation of the composition to be applied thereto. Preheated stators are transferred to section B of the track which constitutes a dipping or immersing station. At this station, a vertically movable tank 42 containing the liquid completely polymerizable composition is supported for vertical movement on a piston 44 movable by a hydraulic cylinder 46 supplied with hydraulic fluid 48 from a suitable source. When a pair of preheated stators 30 are disposed above the tank 42, the tank 42 is elevated by piston 44 to immerse the stators in the completely reactive composition in the tank. The completely reactive composition is replenished by a suitable flexible conduit 50 supplied by pump 52 from a large quantity of the composition 56 contained in a storage tank 58. The pumped composition is preferably cooled by passage through a heat exchanger 54 to reduce its temperature so that the composition will not gel or deteriorate unduly in the tank 42. After the stators have been immersed in the tank 42 for a suitable time to impregnate the stator windings with composition gelled by the stator's heat, the tank 42 is lowered and the stators 30 are then moved to the station C of the track passing through a baking oven 60 heated by means of infrared lamps 62.

The pump 52 may be operated to introduce a considerable excess of composition 56 into tank 42 so that the outside surfaces of the stators are in contact with a stream of cool moving composition that does not remain in contact therewith long enough to gel, thereby the inner bore of each stator acquires only a small thickness of the composition. Excess composition overflows into the well 61 in the tank and thence into a return conduit 63 back to tank 58 where a cooling coil 64 reduces the temperature enough to secure an adequate tank life.

While Figs. 1 and 2 show mechanically operable apparatus suitable for continuous or semi-continuous activity, the process may be performed entirely manually or by using batch methods or in any other suitable way.

The following examples are illustartive of the practice of the invention:

*Example I*

A completely reactive composition was prepared by dissolving 35 parts by weight of a reaction product X, 35 parts of a reaction product Y and 30 parts monostyrene, containing 0.01% by weight of quinhydrone and 0.3% by weight of benzoyl peroxide, as a catalyst. The composition had a viscosity of 90 seconds at 23° C. measured with Demmler Cup No. 1. The composition X in this example was prepared by reacting 80 parts of linseed oil, 20 parts of castor oil and 30 parts maleic anhydride, all parts by weight, at a temperature of from 175° C. and 190° C. for 10 hours. Composition Y was prepared by reacting 100 parts of castor oil and 30 parts maleic anhydride for 2 hours at 135° C.

A motor stator weighing 9830 grams was heated to 194° C., which is approximately 70° C. above the gelation temperature of the composition, and was immersed for 9 minutes in the composition. During this time the stator was kept in motion by raising and lowering it along the bore axis every few seconds to prevent excess gel being formed in the bore. After withdrawing from the composition, the treated stator was found to contain a complete filling of solid gel within the interstices of the windings, which in this example were formed from enameled wire. The stator was then baker 2 hours in a hot air oven at a temperature of 175° C. After cooling the stator was reweighed and found to have picked up 350 grams of solid resin. The same stators treated in conventional varnishes containing volatile solvent ordinarily do not pick up more than 40 grams of dry varnish after one immersion and baking. The conventional varnish merely coats the windings without filling the interstices to any marked degree. After being cut in two, the stator produced in accordance with this example was observed to have its slots solidly filled with the polymerized resin. Several other stators were dipped subsequently in the batch of the composition with similar results. The resin composition was not appreciably changed by the immersion of this number of the hot stators therein and exhibited good operating life.

*Example II*

A completely reactive composition was prepared by dissolving (*a*) 35 parts by weight of monostyrene, and (*b*) 65 parts by weight of a resin prepared by reacting 92 parts of glycerine and 280 parts of linseed oil fatty acids for 2 hours at a temperature of 200° C., then adding 111 parts by weight of phthalic anhydride and continuing the reaction for 11 hours from 200° C. to 240° C., the temperature of the product was then reduced to 128° C. and 49 parts of maleic anhydride were added and the mixture heated for 8 hours at a temperature of between 125° C. and 150° C. The monostyrene and resin composition was catalyzed with 0.5% by weight of tertiary butyl perbenzoate. The resin gelled in 2 to 5 minutes when heated to 120° C.

A small motor stator 2″ in diameter was heated to 200° C. and immersed for 5 minutes in the composition. A resin gel completely impregnating all of the interstices of the motor winding and forming a substantial exterior coating of gel was secured. When withdrawn from the composition, practically no drainage was observed. The motor stator was baked for 1 hour at 175° C. to complete the curing of the resin to a hard yet elastic condition. The end windings of the motor were found to be well covered and the slots were completely filled.

Comparative tests of the motor stator produced in accordance with this example showed it to have much higher resistance to the effects of high humidity atmospheres than similar stators impregnated twice under vacuum in a high grade electrical insulating varnish containing a volatile solvent.

*Example III*

A small transformer assembly comprising a coil composed of enameled wire and a paper wrapping associated with a wound core was heated to 180° C. in a force draft oven. The transformer assembly was then immersed for 7 minutes in the resin composition of Example I.

After withdrawing from the composition, it was observed to be well covered with a gel of the composition. The transformer assembly with the gel composition was baked for 12 hours at 135° C. which cured the resin to a hard tough state. When the coil was cut in two, it was found to be solidly impregnated with the resin.

*Example IV*

A railway motor field coil comprising heavy copper wire coated with asbestos and enamel was preheated to 200° C. and immersed in a composition comprising 70 parts by weight of the reaction product of castor oil, maleic anhydride corresponding to the reaction product Y of Example I and 30 parts by weight of monostyrene with 0.5% by weight of tert.-butyl perbenzoate as a catalyst. After being immersed in the composition for 8 minutes, the coil was withdrawn and found to have an excellent gelled coating of the composition formed therein. After baking for 2 hours at 175° C., the resin had cured to a solid body providing not only good exterior insulation but also excellent filling for all of the interstices of the coil.

Transformer coils wound from copper strap and numerous other electrical coils were treated in these and other compositions in the same manner with similar uniformly good results.

The completely polymerizable reactive compositions such, for example, as the composition 20 in Fig. 1 of the drawing preferably contain a polymerization catalyst to expedite gelling. Suitable catalysts include peroxides, ozonides, perhalides and peracids. Examples of suitable catalysts are benzoyl peroxide, tert.-butyl perbenzoate, tert.-butyl hydro-peroxide, di-t-butyl peroxide, di-t-butyl diperphthalate, 1-hydroxy cyclohexyl hydroperoxide-1, and ascaridol. While as little as 0.1% or less of the polymerization catalyst, based on the weight of the composition, may be employed, more rapid reaction is obtained if the amount of the catalyst is higher—preferably from ½% to 2% by weight. The polymerization catalyst, when admixed in the completely-reactive composition, may cause it to increase in viscosity slowly at ordinary temperatures (25° C.); and, therefore, it may be desirable to cool the catalyzed compositions to a temperature of 10° C. or lower thereby increasing the tank life of the catalyzed composition. Small amounts of inhibitors such as hydroquinone may be added to advantage.

The temperature at which the composition gels in from 2 to 5 minutes must be determined for the composition containing catalyst, inhibitor and any other added plasticizer, filler or the like.

Numerous other compositions are suitable for the practice of the process of this invention, and the following examples are illustrative of such other completely-reactive compositions:

*Example IV.*—The reaction product of 4 moles of maleic anhydride, 1 mole of adipic acid, and 5 moles of ethylene glycol, dissolved in an equal weight of diallyl phthalate.

*Example V.*—The reaction product of 50 parts by weight of maleic anhydride, and 54 parts by weight of diethylene glycol dissolved in monomeric vinyl acetate, in the proportion of 80 parts of the diethylene glycol maleate and 20 parts of the vinyl acetate.

*Example VI.*—Fumaric acid, 50 parts, and diethylene glycol, 50 parts, reacted and the product dissolved in monostyrene.

*Example VII.*—The reaction product of diethylene glycol, 13 parts; maleic anhydride, 28 parts; and tung oil, 7.5 parts, dissolved in methyl methacrylate in equal parts.

*Example VIII.*—Diethylene glycol (30 parts), maleic anhydride (13 parts), and phthalic anhydride (22 parts) were reacted and dissolved in diallyl maleate in the proportion of 3 parts of the ester to 1 of the diallyl maleate.

*Example IX.*—A mixture of 40 parts of diallyl phthalate and 60 parts of ethylene glycol maleate and 0.2 parts of benzoyl peroxide, forms a composition that gels in approximately two minutes at 120° C.

*Example X.*—A mixture of 13 parts of ethylene glycol maleate dissolved in 7 parts of methallyl alcohol produces a completely reactive solution that gels in approximately ten minutes at 90° C., and in a few minutes at 120° C.

It will be appreciated that the completely polymerizable reactive compositions when catalyzed, will gel at lower temperatures, though quite slowly, and to insure good tank life they must be kept cool, as by suitable refrigeration or cooling coils, to temperatures below 50° C., and usually at 25° C. to 10° C. or even lower. When a preheated member is immersed in the relatively cold composition, it drops in temperature due to the dissipation of heat to the composition. A marked thermal gradient exists in the composition contacting the surface of the member, and only a relatively thin layer of the composition immediately adjacent the member is heated to a temperature sufficient to cause it to gel in a few minutes. As the time of immersion is lengthened, providing the member has adequate heat capacity, more of the adjacent composition is heated to the gel temperature. However, the member should not be kept in the cold composition until it has cooled considerably below the temperature at which the composition will gel in 2 to 5 minutes since the gel formed on and attached to the member may be affected by the monomeric components of some of the compositions so that it softens or even dissolves and thereby the gel is lost.

Since certain changes may be made in the above invention and different embodiments of the invention may be made without departing from the scope thereof, it is intended that all matter contained in the above-described disclosure shall be interpreted as illustrative and not in a limiting sense.

I claim as my invention:

1. In the process of treating a member with a completely polymerizable thermosettable resinous composition, the composition being polymerizable to a gel when heated for 2 to 5 minutes at a predetermined temperature, the steps comprising heating the member to a temperature of not substantially exceeding the order of 200° C. and at least 20° C. above the predetermined temperature, dipping the heated member in the completely polymerizable composition for a period of time of the order of several minutes to cause the composition in contact with the member to polymerize and gel, the thickness of the gel being proportional to the time of immersion in the composition, withdrawing the member when a sufficiently thick thermoset coating of the gel has formed on the member, and heat-treating the member and gel coating to complete the polymerization of the applied composition.

2. In the process of treating an electrical member having a relatively open winding with a completely polymerizable thermosettable resinous composition to impregnate the winding with the polymerizable composition, the composition being polymerizable to a gel on being heated for from 2 to 5 minutes at a predetermined temperature in the range of from 50° C. to 150° C., the steps comprising preheating the electrical member to a temperature of the order of 200° C. and at least 20° C. above the predetermined temperature, dipping the preheated electrical member in the completely polymerizable composition to fill the interstices of the winding with the polymerizable composition, the heat of the windings causing the polymerizable composition in the windings to polymerize progressively into a gel, the amount of composition gelled on the winding being proportional to the time of immersion in the composition, withdrawing the electrical member when a sufficient amount of gelled composition has accumulated on the electrical member, and further heating the electrical member and applied gelled composition to complete the polymerization thereof to a cured state.

3. In the process of treating an electrical member having interstices to be filled with a completely polymerizable thermosettable resinous composition, the polymerizable composition being rapidly polymerizable to a gel and then to a solid upon being heated above a predetermined temperature, the steps comprising preheating the electrical member to a temperature of the order of 200° C. and at least 20° C. above the predetermined temperature, immersing the preheated member in the completely polymerizable resinous composition whereby the polymerizable composition penetrates the interstices of the member and the heat of the member causes the adjacent polymerizable composition to polymerize and gel progressively, the thickness of the gel being proportional to the time of immersion in the composition, withdrawing the member when a sufficient amount of the gelled composition has gelled to fill the interstices, and further heating the applied gelled composition to complete its polymerization to a solid.

4. In the process of treating an electrical member having interstices to be filled with a completely polymerizable thermosettable resinous composition, the polymerizable composition being rapidly polymerizable to a gel and then to a solid upon being heated above a predetermined temperature, the steps comprising preheating the electrical member to a temperature of the order of 200° C. and at least 20° C. above the predetermined temperature, immersing the preheated member in the completely polymerizable resinous composition whereby the polymerizable composition penetrates the interstices of the member and the heat of the member causes the adjacent polymerizable composition to polymerize and gel progressively, causing relative movement to take place between the member and the composition so that only a small thickness of gel is formed on the exterior surfaces of the member, withdrawing the member when a sufficient amount of the gelled composition has gelled to fill the interstices, and further heating the applied gelled composition to complete its polymerization to a solid.

5. In the process of treating an electrical member having interstices to be filled with a completely polymerizable thermosettable resinous composition, the polymerizable composition being rapidly polymerizable to a gel and then to a solid upon being heated above a predetermined temperature, the steps comprising preheating the electrical member to a temperature of the order of 200° C. and at least 20° C. above the predetermined temperature, immersing the preheated member in the completely polymerizable resinous composition whereby the polymerizable composition penetrates the interstices of the member and the heat of the member causes the adjacent polymerizable composition to polymerize and gel progressively, moving the electrical member through the polymerizable composition to prevent any large amount of polymerizable composition adjacent the exterior surfaces of the member to be heated to produce a gel whereby only a thin exterior thermoset coating of gel is formed thereon, withdrawing the member when a sufficient amount of the gelled composition has gelled to fill the interstices, and further heating the applied gelled composition to complete its polymerization to a solid.

NEWTON C. FOSTER.

References Cited in the file of this patent

UNITED STATES PATENTS

| Number | Name | Date |
|---|---|---|
| 1,591,534 | Kessler | July 6, 1926 |
| 1,786,824 | Cochran | Dec. 30, 1930 |
| 2,411,180 | Alexander | Nov. 19, 1946 |
| 2,414,525 | Hill et al. | Jan. 21, 1947 |
| 2,459,018 | De Monte et al. | Jan. 11, 1949 |
| 2,464,568 | Flynn et al. | Mar. 15, 1949 |
| 2,550,232 | Donnell | Apr. 24, 1951 |
| 2,561,982 | Hanna et al. | July 24, 1951 |

OTHER REFERENCES

Modern Plastics, June 1947, pages 110 and 111

Modern Plastics, Aug. 1947, pages 108–111.